(12) United States Patent
Saring et al.

(10) Patent No.: US 8,812,542 B1
(45) Date of Patent: Aug. 19, 2014

(54) ON-THE-FLY DETERMINING OF ALERT RELATIONSHIPS IN A DISTRIBUTED SYSTEM

(75) Inventors: Alik Saring, Karnataka (IN); Cheuk Lam, Yorktown Heights, NY (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/435,183

(22) Filed: Mar. 30, 2012

(51) Int. Cl.
*G06F 7/00* (2006.01)
*G06F 17/30* (2006.01)

(52) U.S. Cl.
USPC .......................... 707/770; 707/778; 715/853

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,381,470 A * | 1/1995 | Cambray et al. | 379/216.01 |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,434,637 B1 | 8/2002 | D'Errico | |
| 6,622,221 B1 | 9/2003 | Zahavi | |
| 6,799,199 B1 * | 9/2004 | Segal et al. | 709/207 |
| 6,965,845 B2 | 11/2005 | Ohsie et al. | |
| 7,003,433 B2 | 2/2006 | Yemini et al. | |
| 7,292,969 B1 | 11/2007 | Aharoni et al. | |
| 7,392,360 B1 | 6/2008 | Aharoni et al. | |
| 7,441,023 B2 | 10/2008 | Benjamin et al. | |
| 7,529,181 B2 | 5/2009 | Yardeni et al. | |
| 7,680,951 B1 * | 3/2010 | Kulik | 709/238 |
| 7,688,753 B1 | 3/2010 | Zimran et al. | |
| 7,720,003 B2 | 5/2010 | Benjamin et al. | |
| 7,779,291 B2 | 8/2010 | Yoder et al. | |
| 7,783,778 B2 | 8/2010 | Benjamin | |
| 8,028,062 B1 | 9/2011 | Wigmore et al. | |
| 8,032,621 B1 * | 10/2011 | Upalekar et al. | 709/223 |
| 2002/0010765 A1 * | 1/2002 | Border | 709/220 |
| 2003/0065659 A1 * | 4/2003 | Agarwal et al. | 707/4 |
| 2003/0065986 A1 * | 4/2003 | Fraenkel et al. | 714/47 |
| 2003/0093514 A1 * | 5/2003 | Valdes et al. | 709/224 |
| 2004/0081310 A1 * | 4/2004 | Lueckhoff | 379/265.09 |
| 2005/0216781 A1 * | 9/2005 | Doshi et al. | 714/2 |
| 2005/0251371 A1 * | 11/2005 | Chagoly et al. | 703/1 |
| 2005/0283753 A1 * | 12/2005 | Ho et al. | 717/102 |
| 2006/0010119 A1 * | 1/2006 | Jonas | 707/3 |
| 2007/0276780 A1 * | 11/2007 | Iriyama et al. | 707/1 |
| 2008/0133552 A1 * | 6/2008 | Leary | 707/100 |

(Continued)

OTHER PUBLICATIONS

Keeping Track of 70,000+ Servers, The Akamai Query System, Cohen et al., Proceedings of the 24th international conference on Large installation system administration (LISA), 2010.*

(Continued)

*Primary Examiner* — Augustine K Obisesan
(74) *Attorney, Agent, or Firm* — Muirhead and Saturnelli, LLC

(57) ABSTRACT

A system provides a controller user interface control and/or display of aspects of a storage area network (SAN) and components thereof, including performance characteristics and alert relationship analyses. The controller enables determinations of alert relationships "on-the-fly" for alerts affecting and affected by multiple causes, symptoms and impacts in the SAN, including on-the-fly determinations of root causes. The on-the-fly determinations of the controller provide that the alert relationships may be determined in response to a query or request by the user without requiring the maintaining of a large stored hierarchical relationship structure of alerts.

20 Claims, 9 Drawing Sheets

(56) References Cited

U.S. PATENT DOCUMENTS

| | | | |
|---|---|---|---|
| 2008/0147646 A1* | 6/2008 | Jaschek et al. | 707/5 |
| 2008/0208953 A1* | 8/2008 | Tian | 709/201 |
| 2008/0263009 A1* | 10/2008 | Buettner et al. | 707/3 |
| 2008/0270380 A1* | 10/2008 | Ohrn et al. | 707/5 |
| 2011/0016114 A1* | 1/2011 | Allen et al. | 707/726 |
| 2011/0029882 A1* | 2/2011 | Jaisinghani | 715/736 |
| 2011/0115649 A1* | 5/2011 | Smith et al. | 340/963 |
| 2012/0124503 A1* | 5/2012 | Coimbatore et al. | 715/772 |
| 2012/0304022 A1* | 11/2012 | Carey et al. | 714/48 |

OTHER PUBLICATIONS

Clustering Intrusion Detection Alarms to Support Root Cause Analysis, Julisch et al, ACM Transaction on Information and System Security, 6(4), pp. 443-471, Nov. 2003.*

Problem Determination Using Dependency Graphs Run-Time Behavior Models, Agarwal et al., DSOM, International Federation for Information Processing, LNCS 3278, pp. 171-182, 2004.*

Information Alert in Distributed Digital Libraries: The Models, Languages, and Architecture of DIAS, Koubarakis et al EECDL, LNCS 2458, pp. 527-542, 2002.*

An IDS Alert Fusion Approach Based on Happened Before Relation, Xu et al., IEEE, 2008.*

Alert Correlation in a Cooperative Intrusion Detection Frramework, Cuppens et al, Proceedings of the 2002 IEEE Symposium on Security and Privacy (S&P'02), 2002.*

Construct Efficient Hyper-Alert Correlation for Defense-in-Depth Network Security System, Huang et al, LNCS 3090, pp. 886-894, 2004.*

Building network attack graph for alert casual correlation, Zhang et al., Computer & Security, 27, pp. 188-196, 2008.*

U.S. Appl. No. 12/807,943, filed Sep. 17, 2010, Colon et al.

U.S. Appl. No. 13/065,806, filed Mar. 30, 2011, Smirnov et al.

U.S. Appl. No. 13/335,316, filed Dec. 22, 2011, Lim et al.

EMC Corporation, "EMC Smarts IP Availibility Manager: Technology for IP Network Management, Including Network-Attached Storage," White Paper S0051, Nov. 2005, 9 pp.

EMC Corporation, "EMC Ionix Storage Insight for Availability," Data Sheet S0059.2, May 2009, 4 pp.

EMC Corporation, "EMC Ionix ControlCenter (formerly EMC ControlCenter) 6.0 StorageScope: Best Practices Planning," White Paper H4154, Jun. 2009, 43 pp.

EMC Corporation, "EMC Symmetrix Storage Management Solution," Data Sheet H6194.2, Nov. 2010, 5 pp.

VCE Company, "Simplifying Incident and Problem Management with Vblock™ Infrastructure Platforms," White Paper, Feb. 2011, 18 pp.

VCE Company, "Automated Monitoring and Event Recovery of Vblock™ Infrastructure Platforms with IPSoft Managed Service," White Paper, May 2011, 20 pp.

EMC Corporation, "ProSphere Discovery and Monitoring for the Modern Data Center," White Paper H8890, Aug. 2011, 17 pp.

EMC Corporation, "ProSphere: Next Generation Storage Resource Management," White Paper H8886, Aug. 2011, 13 pp.

EMC Corporation, "Diagnosing Performance Issues With ProSphere: An Introduction to Use Cases and Architecture," White Paper H8935, Sep. 2011, 14 pp.

EMC Corporation, "EMC Ionix Unified Infrastructure Manager/Operations: Centralized visibility into VCE Vblock Infrastructure Platforms and Their Availability," Data Sheet H8713.2, Nov. 2011, 2 pp.

* cited by examiner

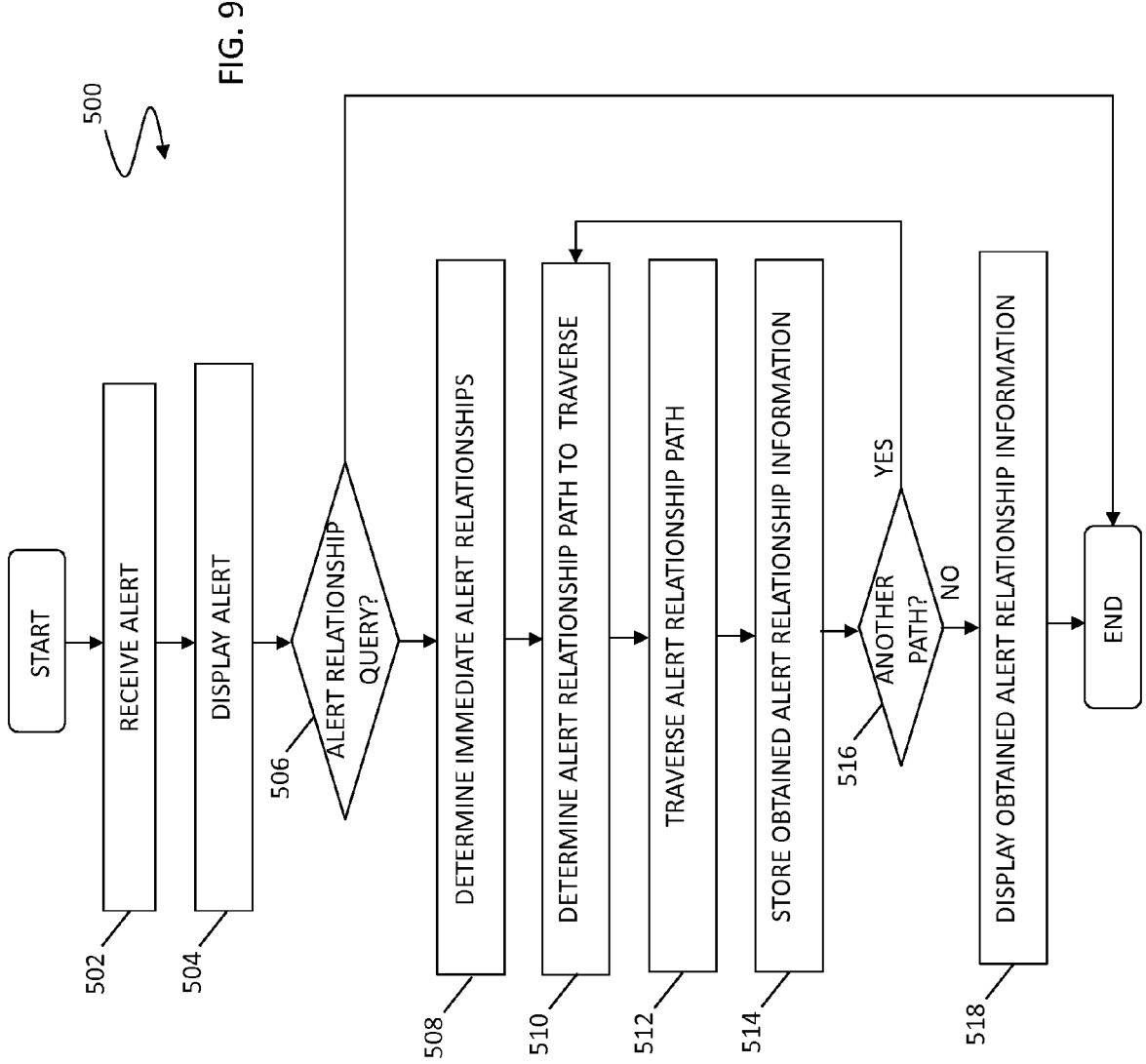

ON-THE-FLY DETERMINING OF ALERT RELATIONSHIPS IN A DISTRIBUTED SYSTEM

TECHNICAL FIELD

This application relates to storage area networks and, more particularly, to the field of on-the-fly determining of alert relationships in a distributed system, such as a storage area network.

BACKGROUND OF THE INVENTION

Host processor systems may store and retrieve data using storage devices (also referred to as storage arrays) containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives. The hosts, storage devices and/or other elements, such as switches and/or array components, may be provided as part of a storage area network (SAN).

Performance characteristics of the storage devices and/or other elements of the SAN may be monitored according to different performance statistics and measures. Performance characteristics may include, for example, performance data, capacity data, and/or discovery data, including configuration data and/or topology data, among other characteristics. As an example, performance characteristics of input/output (I/O) data paths among storage devices and components may be measured and may include I/O operations (e.g., measured in I/Os per second and Mbs per second) initiated by a host that will result in corresponding activity in SAN fabric links, storage array ports and adapters, and storage volumes. Other characteristics may similarly be measured. Such characteristics may be significant factors in managing storage system performance, for example, in analyzing use of lowering access performance versus more expensive higher performance disk drives in a SAN, or by expanding number of SAN channels or channel capacity. Users may balance performance, capacity and costs when considering how and whether to replace and/or modify one or more storage devices or components.

Known techniques and systems for performing root cause and impact analysis of events occurring in a system may provide automated processes for correlating the events with their root causes. Such automation techniques address issues of an outage causing a flood of alarms in a complex distributed system comprised of many (e.g., thousands) of interconnected devices. Reference is made, for example, to: U.S. Pat. No. 7,529,181 to Yardeni et al., entitled "Method and Apparatus for Adaptive Monitoring and Management of Distributed Systems," that discloses a system for providing adaptive monitoring of detected events in a distributed system; U.S. Pat. No. 7,003,433 to Yemini et al., entitled "Apparatus and Method for Event Correlation and Problem Reporting," that discloses a system for determining the source of a problem in a complex system of managed components based upon symptoms; and U.S. Pat. No. 6,965,845 to Ohsie et al., entitled "Method and Apparatus for System Management Using Codebook Correlation with Symptom Exclusion," that discloses a system for correlating events in a system and provides a mapping between each of a plurality of groups of possible symptoms and one of a plurality of likely problems in the system, all of which are assigned to EMC Corporation and are incorporated herein by reference. However, it is noted that such known techniques and systems may involve the maintaining of a large hierarchical relationship structure of alerts that may cause undesirable performance bottlenecks in some circumstances, such as in connection with the processing of updates in the distributed system.

Accordingly, it would be desirable to provide a system that may be advantageously and efficiently used to determine alert relationships in a SAN, including relationships among root causes, symptoms and impacts of events on various components of the SAN.

SUMMARY OF THE INVENTION

According to the system described herein, a method for determining alert relationships in a distributed system includes receiving an alert for the distributed system. It is determined whether alert relationship information is requested in a query concerning the received alert. An alert relationship path is determined for traversal based on the received alert and responsive to the query. The alert relationship path is traversed to obtain alert relationship information responsive to the query, wherein the traversing of the alert relationship path is performed on-the-fly. The alert relationship information responsive to the query is displayed. The distributed system may include a storage area network. The method may be performed using a controller having a console providing a user interface. The console may include a RESTful interface. The alert relationship information may include at least one root cause of the received alert and/or at least one impact caused by the received alert. The alert relationship path may include at least alert beyond immediate preceding or subsequent relationship alerts of the received alert.

According further to the system described herein, a non-transitory computer readable medium stores software for determining alert relationships in a distributed system. The software includes executable code that receives an alert for the distributed system. Executable code may be provided that determines whether alert relationship information is requested in a query concerning the received alert. Executable code may be provided that determines an alert relationship path for traversal based on the received alert and responsive to the query. Executable code may be provided that traverses the alert relationship path to obtain alert relationship information responsive to the query, wherein the traversing of the alert relationship path is performed on-the-fly. Executable code may be provided that displays the alert relationship information responsive to the query. The distributed system may include a storage area network. The software may be executed using a controller having a console providing a user interface. The console may include a RESTful interface. The alert relationship information may include at least one root cause of the received alert and/or at least one impact caused by the received alert. The alert relationship path may include at least alert beyond immediate preceding or subsequent relationship alerts of the received alert.

According further to the system described herein, a system for determining alert relationships in a distributed system includes a console providing a controller with a user interface, wherein the controller includes at least one processor that executes software stored on a computer readable medium. The software includes executable code that receives an alert for the distributed system. Executable code may be provided that determines whether alert relationship information is requested in a query concerning the received alert. Executable code may be provided that determines an alert relationship path for traversal based on the received alert and responsive to the query. Executable code may be provided that traverses the alert relationship path to obtain alert relationship information responsive to the query, wherein the traversing of the alert relationship path is performed on-the-fly. Executable code may be provided that displays the alert relationship information responsive to the query. The distributed system may include a storage area network. The console may include a RESTful interface. The alert relationship information may include at least one root cause of the received alert and/or at least one impact caused by the received alert. The alert relationship path may include at least alert beyond immediate preceding or subsequent relationship alerts of the received alert.

BRIEF DESCRIPTION OF THE DRAWINGS

Embodiments of the system are described with reference to the several figures of the drawings, which are briefly described as follows.

FIG. 9 is a flow diagram showing processing for on-the-fly alert relationship determinations according to an embodiment of the system described herein.

DETAILED DESCRIPTION OF VARIOUS EMBODIMENTS

Figure 1:
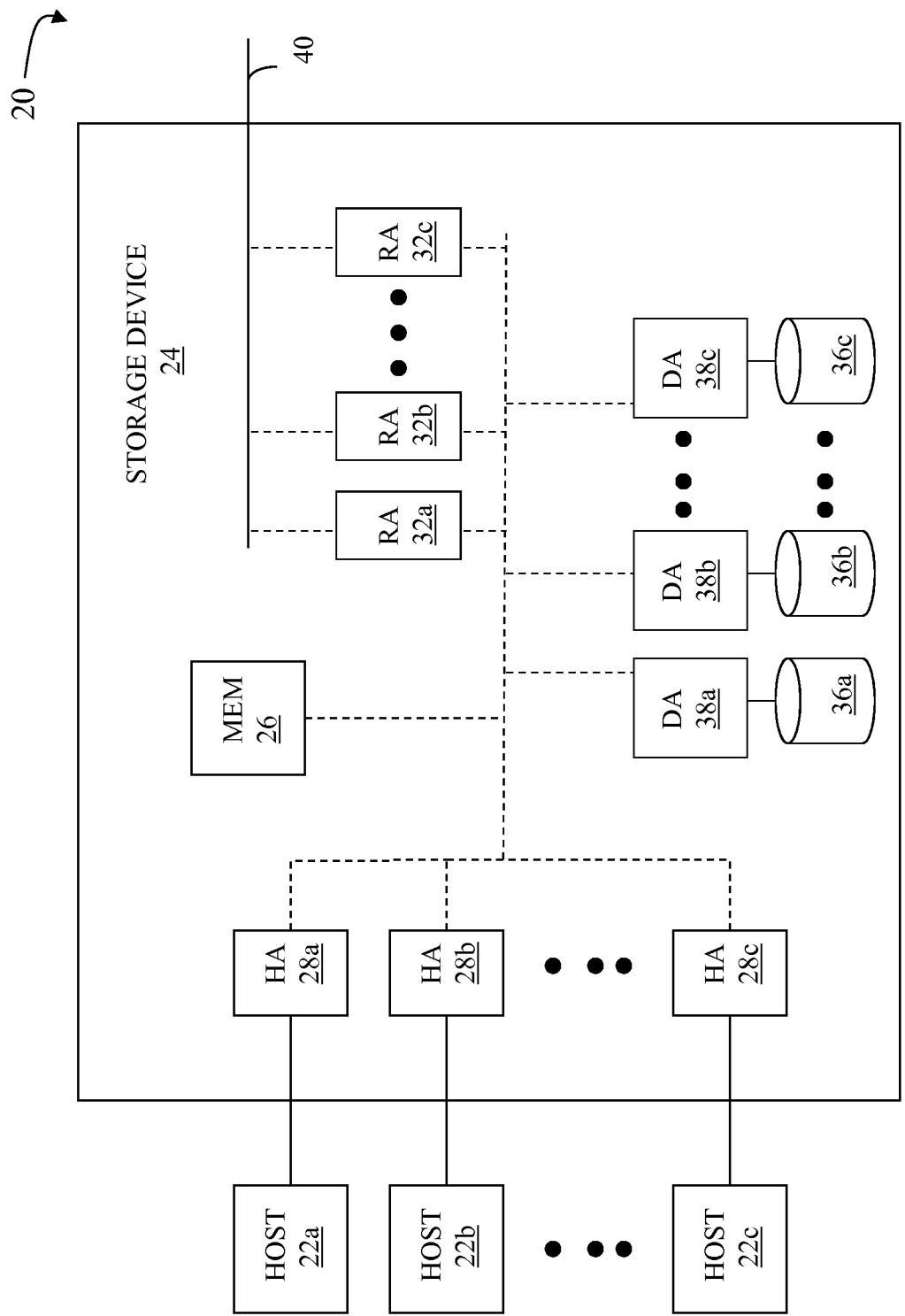
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. In an embodiment, the storage device 24 may be a Symmetrix storage device and/or a CLARiiON storage device produced by EMC Corporation of Hopkinton, Mass.

In an embodiment, the storage device 24 may include one or more Remote Data Facility (RDF) adapter units (RA's) 32a-32c. An RDF product produced by EMC Corporation, may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but are used to transfer data between the storage device 24 and other storage devices that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742,792 to Yanai, et al., entitled "Remote Data Mirroring" and U.S. Pat. No. 7,779,291 to Yoder et al., entitled "Four Site Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22e may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage device 24 may be provided as a stand-alone device coupled to the hosts 22a-22c as shown in FIG. 1 or, alternatively, the storage device 24 may be part of, and/or otherwise coupled to, a storage area network (SAN) that may include a plurality of other storage devices as well as switches, routers, network connections, etc., as further discussed elsewhere herein.

Figure 2:
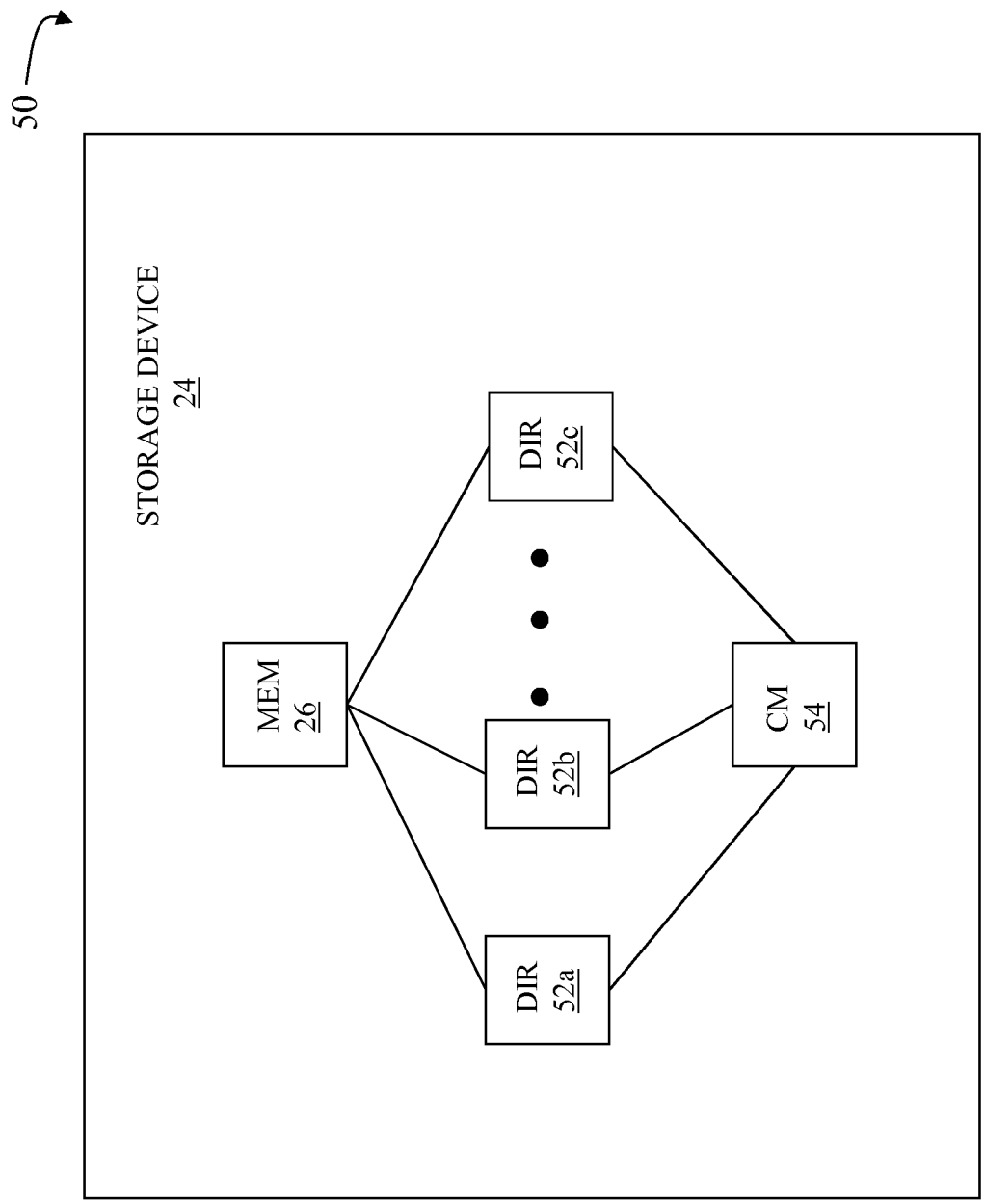
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
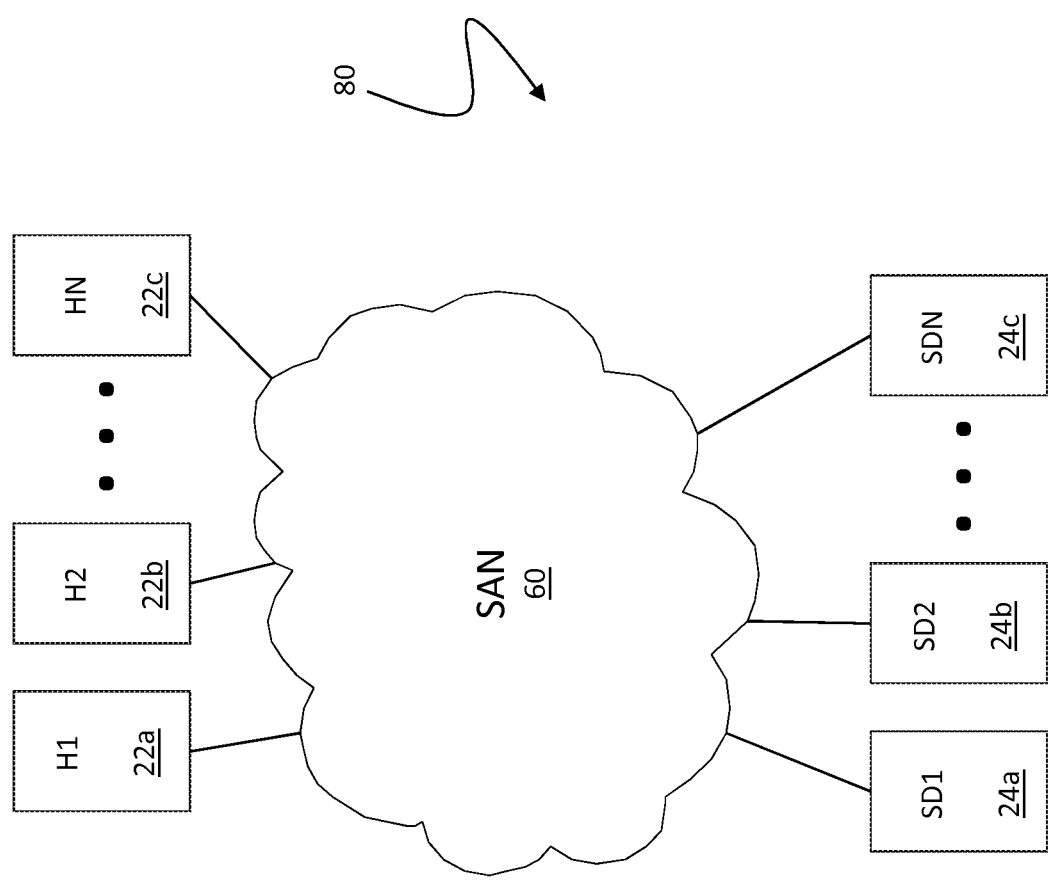
FIG. 3 is a schematic diagram showing a plurality of hosts coupled to a plurality of storage devices via a storage array network (SAN).

FIG. 3 is a schematic illustration 80 showing a storage area network (SAN) 60 providing a SAN fabric coupling a plurality of host devices (H1-HN) 22a-c to a plurality of storage devices (SD1-SDN) 24a-c. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a 64-bit worldwide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

For further discussion of techniques involving the configuration and use of storage area networks, including virtual storage area networks, reference is made, for example, to U.S. Pat. No. 8,028,062 to Wigmore et al., entitled "Non-Disruptive Data Mobility Using Virtual Storage Area Networks With Split Path Virtualization," which is assigned to EMC Corporation and is incorporated herein by reference, that discloses techniques for the creation of a SAN centric storage virtualization layer that allows data mobility and migration without disruption to one or more hosts servers attached to the SAN.

Reference is also made to U.S. Pat. No. 7,441,023 to Benjamin et al., entitled "Method and Apparatus for Modeling and Analyzing MPLS and Virtual Private Networks;" U.S. Pat. No. 7,720,003 to Benjamin et at, entitled "Model-Based Method and Apparatus for Determining MPLS Network Properties;" and U.S. Pat. No. 7,783,778 to Benjamin, entitled "Model-Based Method and Apparatus for Determining Virtual Private Network Topologies," which are assigned to EMC Corporation and are all incorporated herein by reference, that disclose various techniques for discovering and identifying network properties and topologies in a network represented by a model.

Figure 4:
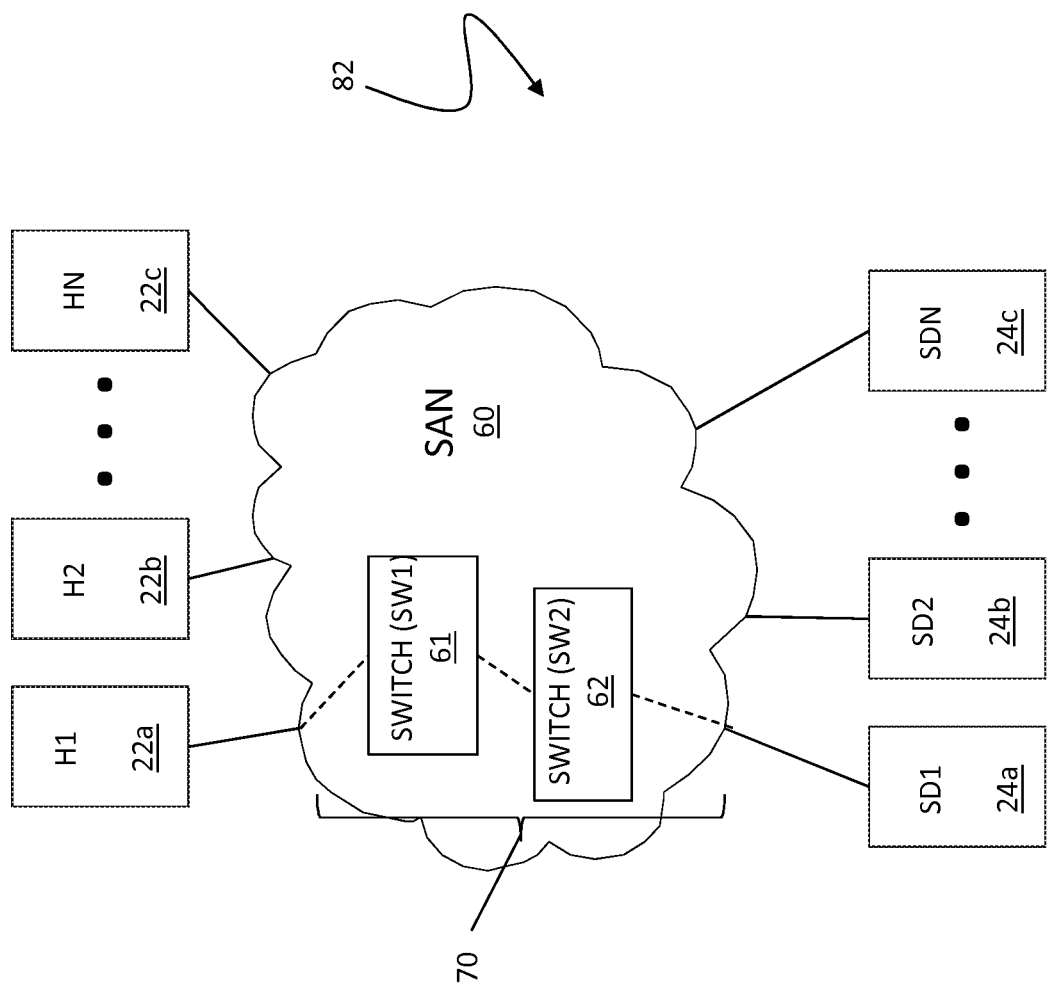
FIG. 4 is a schematic illustration of an embodiment of the SAN shown in FIG. 3 including multiple switches providing an I/O path between a host and a storage device in connection with an embodiment of the system described herein.

FIG. 4 is a schematic illustration 82 showing multiple SAN switches of a SAN, like that of FIG. 3, that may be used in connection with an embodiment of the system described herein. In the illustrated embodiment, the SAN is shown with two switches, switch 61 (SW1) and switch 62 (SW2), that are used in connection with an I/O data path 70 from the host 22a to the storage device 24a. In various embodiments, the switches 61, 62 may include physical and/or logical devices. Although two switches are shown, more than two switches and/or other appropriate elements of a SAN fabric may be used in connection with the providing of I/O data paths from one or more of the hosts 22a-c to one or more of the storages devices 24a-c in connection with path performance data collection according to the system described herein.

The selection and/or identification of the I/O path 70 may be performed according to multiple selection factors and using known path selection techniques. Reference is made, for example, to U.S. Pat. No. 7,688,753 to Zimran et al., entitled "Selection of a Data Path Based on One or More Performance Characteristics of a Computer System," which is assigned to EMC Corporation and is incorporated herein by reference and which discloses techniques for data path selection based on performance characteristics of a computer system using a path selection module. Reference is also made to U.S. Pat. No. 6,434,637 to D'Errico, entitled "Method and Apparatus for Balancing Workloads Among Paths in a Multi-Path Computer System Based on the State of Previous I/O Operations," which is assigned to EMC corporation and is incorporated herein by reference and which discloses techniques for selecting one of at least two I/O data paths for transmission of the next I/O operation based upon a state of previously assigned I/O operations queued for transmission over the I/O paths.

It is further noted that the system described herein may be used in connection with simulation of data storage systems for evaluation purposes. For example, I/O data paths of simulated storage system configurations may be evaluated to determine preferred configurations and/or identify potential problems of a possible I/O data path and elements thereof. Suitable data storage system simulation tools that may be used in connection with the system described herein may include systems and methods like that disclosed in U.S. Pat. No. 7,392,360 to Aharoni et al., entitled "Method and System for Capacity Planning and Configuring One or More Data Storage Systems," U.S. Pat. No. 7,292,969 to Aharoni et al., entitled "Method and System for Simulating Performance on One or More Storage Systems," and U.S. patent application Ser. No. 13/065,806 to Smirnov et al., filed Mar. 30, 2011, entitled "Write Pacing Simulation Tool," which are all assigned to EMC Corporation and which are all incorporated herein by reference.

Figure 5:
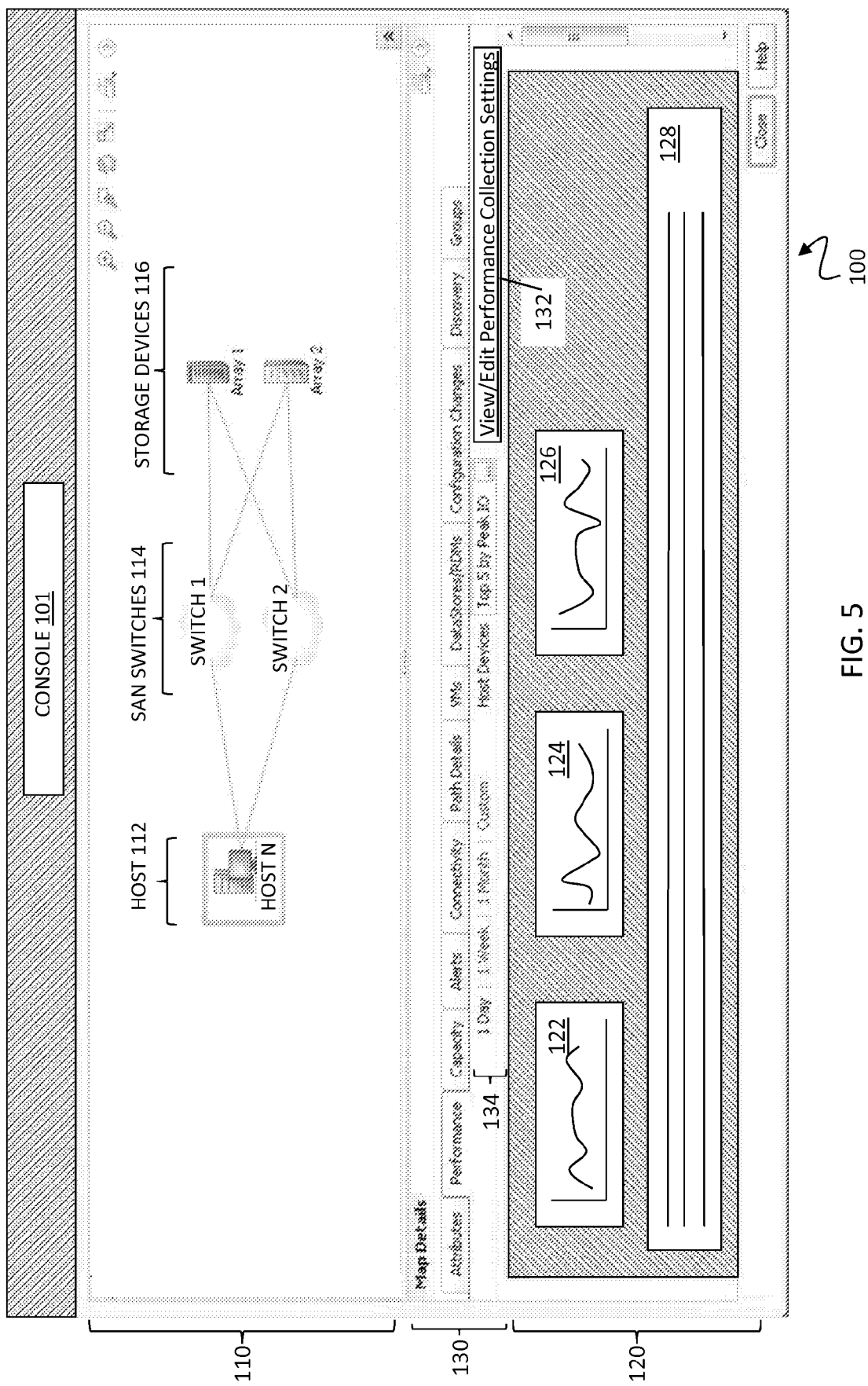
FIG. 5 is a schematic illustration showing a controller according to an embodiment of the system described herein that may include an interface component or console that enables feature control and display.

FIG. 5 is a schematic illustration showing a controller 100 according to an embodiment of the system described herein that may include a console 101 that enables feature control and display. The controller 100 may provide for user interface control and/or display of aspects of the SAN and components thereof, including performance characteristics and alert relationship analyses, according to various embodiments of the system described herein. As discussed in detail elsewhere herein, the controller 100 enables determinations of alert relationships "on-the-fly" for alerts affecting multiple causes, symptoms and impacts and including on-the-fly determinations of root causes. The on-the-fly determinations of the controller 100 provide that the alert relationships may be determined in response to a query or request by the user without requiring the maintaining of a large stored hierarchical relationship structure of alerts.

In the illustrated example of FIG. 5, the console 101 of the controller 100 is shown displaying SAN topology corresponding to one or more I/O data paths for a HOST N of the SAN. The console 101 may be a RESTful (representational state transfer) interface accessible via the Internet. The console 101 may include a graphical section 110 that shows a visual topology representation of the SAN and components thereof. For example, the section 110 graphical displays the host 112 (HOST N), coupled via SAN switches 114, to one or more storage devices/arrays 116. Section 120 may display map details of the SAN elements, for example, performance measures for particular elements of I/O data paths in graph form 122, 124, 126 as well as in text or tabulated form 128. The performance measures displayed may include those discussed elsewhere herein, including workload and performance characteristics such as CPU utilization, memory utilization for the host and IOps (I/O in Mb per sec), response time in ms, throughput in KBps, and queue length for host devices, switches, arrays etc., among other appropriate measures.

Section 130 indicates that multiple types of detail and performance measures may be displayed in various forms for the application host, including features corresponding to the I/O data path attributes, performance, capacity, alerts, connectivity, path details, virtual machine (VM) information, data stores, configuration changes, discovery details and group details. A link button 132 may be provided to view/edit performance collection settings. Additionally, according to an embodiment, portion 134 indicates that historical or past performance data collection may be maintained by the system. For example, a user may view past performance data collection from the prior day, prior week, prior month and/or any other customizable date range.

The controller 100 according to the system described herein may provide for analysis and display of alerts for root causes, symptoms and impacts via a single application control. In an embodiment, the controller 100 may be part of a data collection tool that may provide for collection various types of data concerning performance characteristics of the storage devices and/or other elements of a storage area network (SAN), including I/O data paths, that may be monitored according to various statistics and measures. Performance characteristics may include, for example, performance data, capacity data, discovery data, including configuration data and/or topology data, among other characteristics. Examples of various performance characteristics may include CPU utilization, memory utilization for the host and IOps (I/O in Mb per sec), response time in ms, throughput in KBps, discovered hosts of an I/O data path, queue length for host devices, whether the hosts are virtual (e.g., running as guest operating system or a virtual machine (VM)) or not, the hosts' IP addresses, operating systems and versions thereof, whether the host is in a group or cluster, and/or other appropriate performance characteristics.

In various embodiments, the component 100 may be an application installed on an application host or other computer providing SAN administration and/or management functionality and/or may be installed on one or more of the hosts 22a-c coupled to the SAN. In an embodiment, the component 100 may be used in connection with EMC Ionix products, including the EMC Ionix Unified Infrastructure Manager (UIM) and/or EMC Ionix Storage Insight for Availability, produced by EMC Corporation of Hopkinton, Mass. Other storage management products that may be used in connection with the system described herein may include, for example, EMC's ProSphere product and a Vblock platform product produced by VCE Company, LLC.

In an embodiment, the statistics used by the component 100 according to the system described herein may be gathered by the component according to the data collection techniques discussed elsewhere herein. Reference is made, for example, to U.S. patent application Ser. No. 13/335,316 to Lim et al., filed Dec. 22, 2011, and entitled "Path Performance Data Collection," which is assigned to EMC Corporation and is incorporated herein by reference, that discloses controlled tuning performance data collection provided through a single application controller of a path performance data collection tool and may be used in connection with the system described herein. The performance data collection may be turned on or off from the application host running the tool via a user interface. Lim's tool may automatically (e.g., without user intervention) update performance data collection characteristics as the application host I/O data path changes according to user controlled settings but without requiring further user intervention during the updating. Turning on path performance data collection on the application host via the user interface may automatically set up synchronized performance data collection for all managed objects within an I/O data path.

In various embodiments, data used in connection with the system described herein may obtained using other data collection devices and mechanisms, including products produced by EMC Corporation such as the EMC Workload Analyzer (WLA), the Symmetrix Performance Analyzer (SPA)®, the Symmetrix CLI statistics collection daemon (STP), the Storage Configuration Advisor (SCA) and/or the ProSphere Discovery Engine, among other possible collection devices, applications and/or appliances. Reference is made, for example, to U.S. Pat. No. 6,622,221 to Zahavi, entitled "Workload Analyzer and Optimizer Integration," which is assigned to EMC Corporation and is incorporated herein by reference and which discloses techniques used in connection with evaluating the performance of proposed device swap plans in accordance with past performance data collected.

Figure 6:
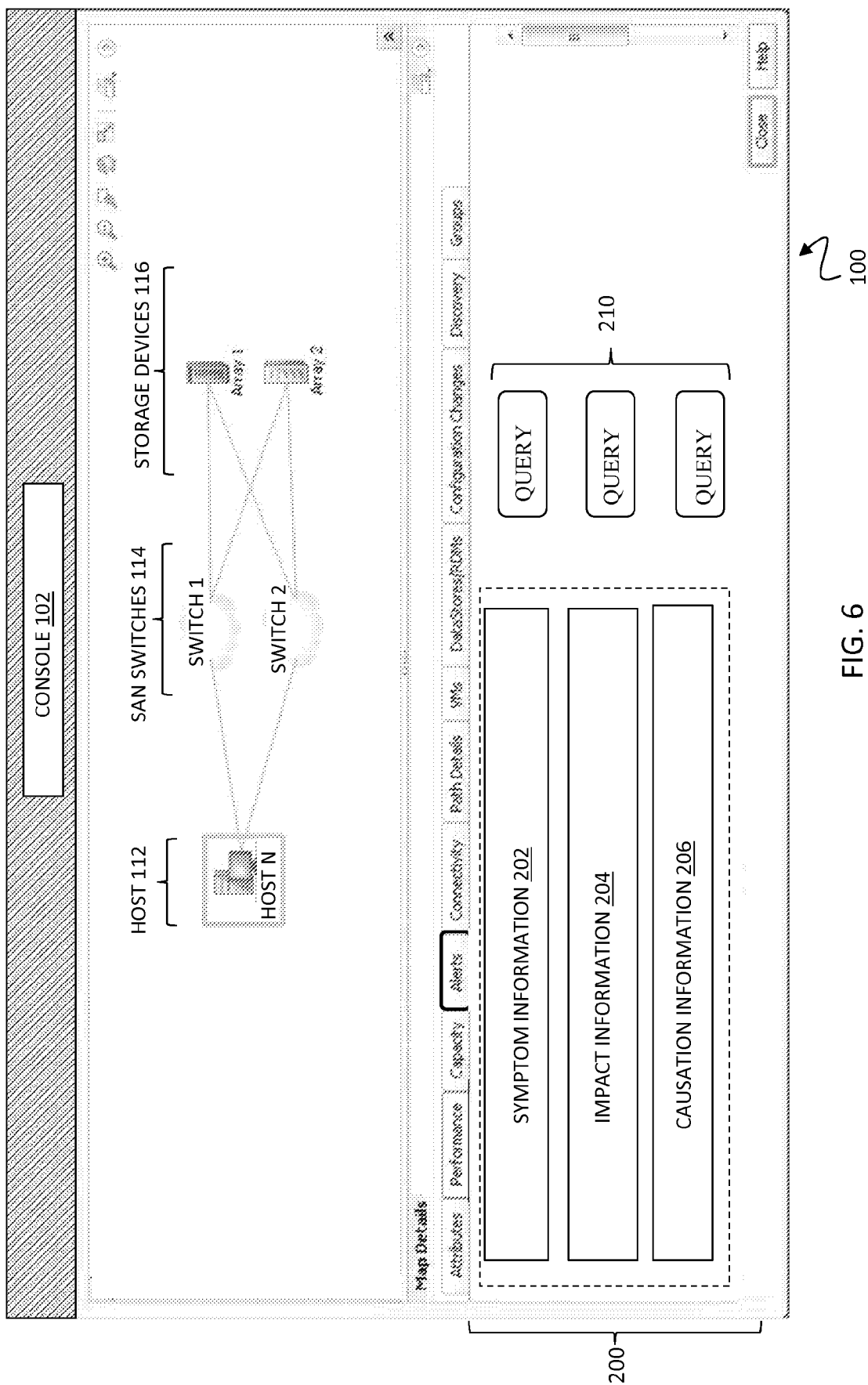
FIG. 6 is a schematic illustration showing another console screen of the controller in which alert relationships for the SAN are illustrated according to an embodiment of the system described herein

FIG. 6 is a schematic illustration showing another console screen (console 102) of the controller 102, having a similar topology display as that of the console 101 but in which alert relationships for the SAN are illustrated in section 200 of the console 102 according to an embodiment of the system described herein. The section 200 shows alert relationship information determined on-the-fly according to the system described herein and including symptom information 202, impact information 204 and causation information 206, including root causes, in connection with one or more alerts. For a given alert, according to the system described herein, only immediate relationships may be maintained as alert attributes information. For example, for the case where an alert "A" is a root cause, alerts "B" and "C" are intermediate symptoms and alerts "I1" and "I2" are impacts, a user who receives alert C will have the following information:

a) C is caused by alert B; and
b) C impacts I1.

According to the system described herein, if the user wants to obtain further information concerning the alert C, the user may request further information, for example, using one or more query buttons 210 and/or other appropriate query mechanism submitted via the controller 100. In an embodiment, the user may query the controller 100 to determine the "RootCausedBy" information for the alert C and determine, by traversal of an alert relationship path as further discussed elsewhere herein, that alert A is the root cause of alert C and obtain alert A's properties. It is noted that there is a possibility that alert C is caused by multiple alerts, in which case the controller 100 may traverse all possible alert relationship paths, as further discussed elsewhere herein, and determine all root cause alerts of C. A similar algorithm may be applied in a different direction, for example, to determine impact alerts caused by alert C.

TABLE 1, below, shows alert relationship information that may be obtained by the controller 100 based on processing according to the system described herein for a use case example in which: A causes B. B causes C. C impacts I1 and A impacts I2.

TABLE 1

| Alert Relationship Information | |
|---|---|
| A:: | Causes B, I2 |
| A:: | CausedBy <Empty> |
| A:: | RootCaused by <Empty> |
| A:: | Impacts I1, I2 |
| B:: | Causes C |
| B:: | CausedBy A |
| B:: | RootCausedBy A |
| B:: | Impacts I1 |
| C:: | Causes I1 |
| C:: | CausedBy B |
| C:: | RootCausedBy A |
| C:: | Impacts I1 |
| I1:: | Causes <Empty> |
| I1:: | CausedBy C |
| I1:: | RootCausedBy A |
| I1:: | Impacts <Empty> |
| I2:: | Causes <Empty> |
| I2:: | CausedBy A |
| I2:: | RootCausedBy A |
| I2:: | Impacts <Empty> |

Figure 7:
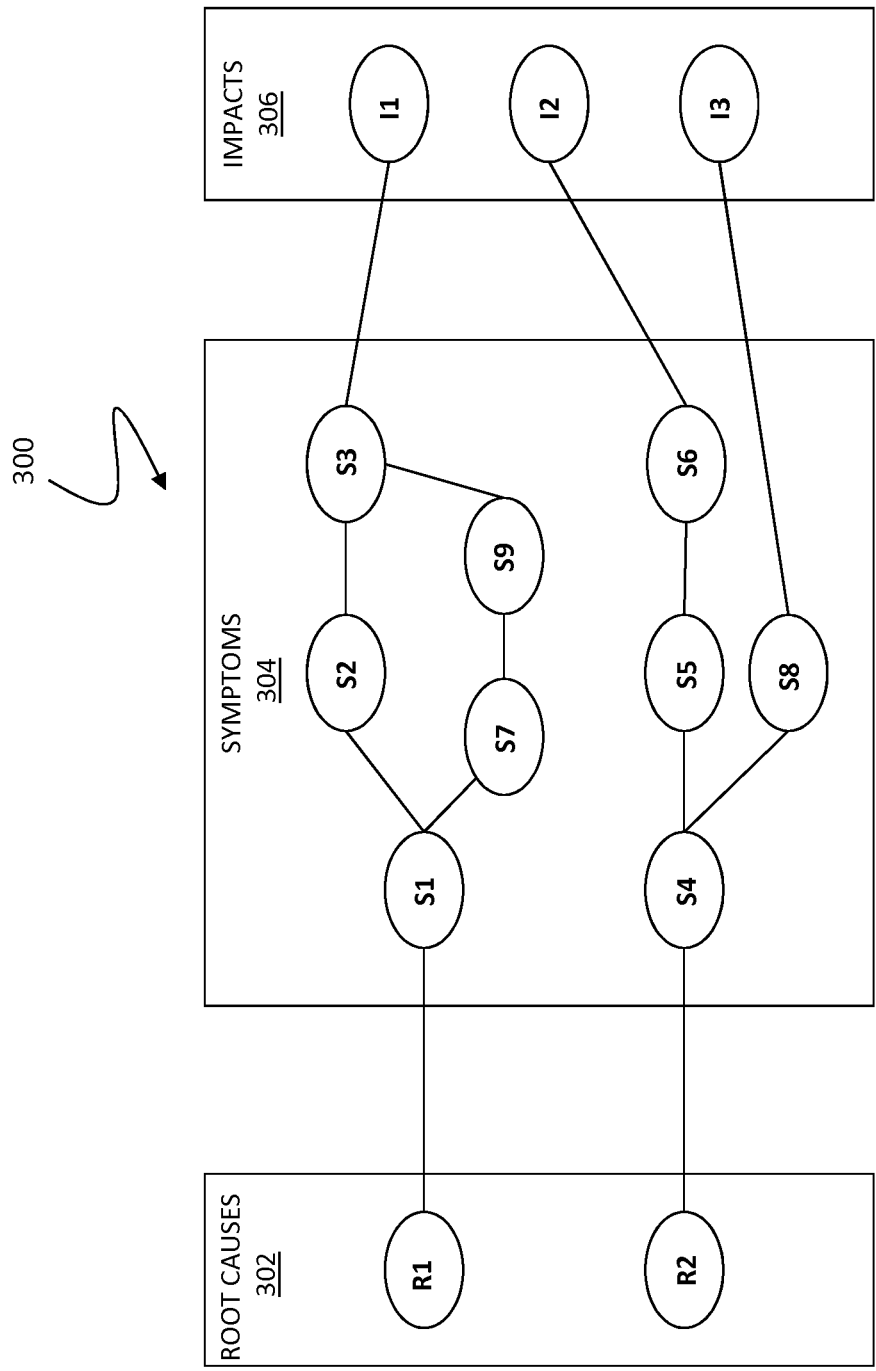
FIG. 7 is a schematic illustration showing an example alert relationship tree with paths that may be traversed according to processing by the controller to determine alert relationships on-the-fly between root causes, symptoms and impacts according to an embodiment of the system described herein.

FIG. 7 is a schematic illustration showing an example alert relationship tree 300 with paths that may be traversed according to processing by the controller 100 to determine alert relationships on-the-fly between root causes 302, symptoms 304 and impacts 306 according to an embodiment of the system described herein. For example, a user may receive and view alert S3 of the tree 300 and desire to know the Root Cause alert of the alert S3. From S3, from the immediate relationships thereof that are maintained, the controller 100 determines that S3 is caused by alerts S9 and S2. Processing of the controller 100 may then include pushing S2 onto a stack and/or other appropriate software structure and traversing the tree beginning from node S9: specifically, S9, S7, S1 and R1. In the tree traversal, the controller 100 may determine from each alert reached the immediate relationships of that alert in order to continue traversing a particular path of the tree 300. The traversing of paths in the tree 300 may be automatic and provide for automated root cause and impact analyses in accordance with the features of the system discussed herein.

In the above-noted example, the controller 100 determines that R1 is a root cause alert of alert S3 and may store this information, e.g., in a RootCauseList. The controller may then pop alert S2 from the stack, and traverse a path through tree 300 beginning with node S2. In this example, the controller 100 will traverse S2 back through S1 to R1 to determine that R1 is the root cause via the S2 path. The controller 100 may determine from the RootCauseList that R1 has already been determined as a root cause for the alert S3. If the controller 100 determines that there are no further alerts from the stack to be traversed, the controller may then return to the requesting user the RootCauseList alerts for S3; specifically, return that R1 is the root cause alert for alert S3. It is noted that a similar algorithm as that noted above may be applied in reverse to determine impact alerts caused by a particular alert. For example, for a received alert S4, for which the user desires to know impact alerts caused thereby, the controller 100 may traverse the tree 300 in a manner similar to that noted discussed above but in a different direction (e.g., paths beginning with alerts S5 and S8, respectively) to determine that impact alerts 12 and 13 (e.g., which may be stored in a Impact-CausedList) are caused by the alert S4.

Figure 8:
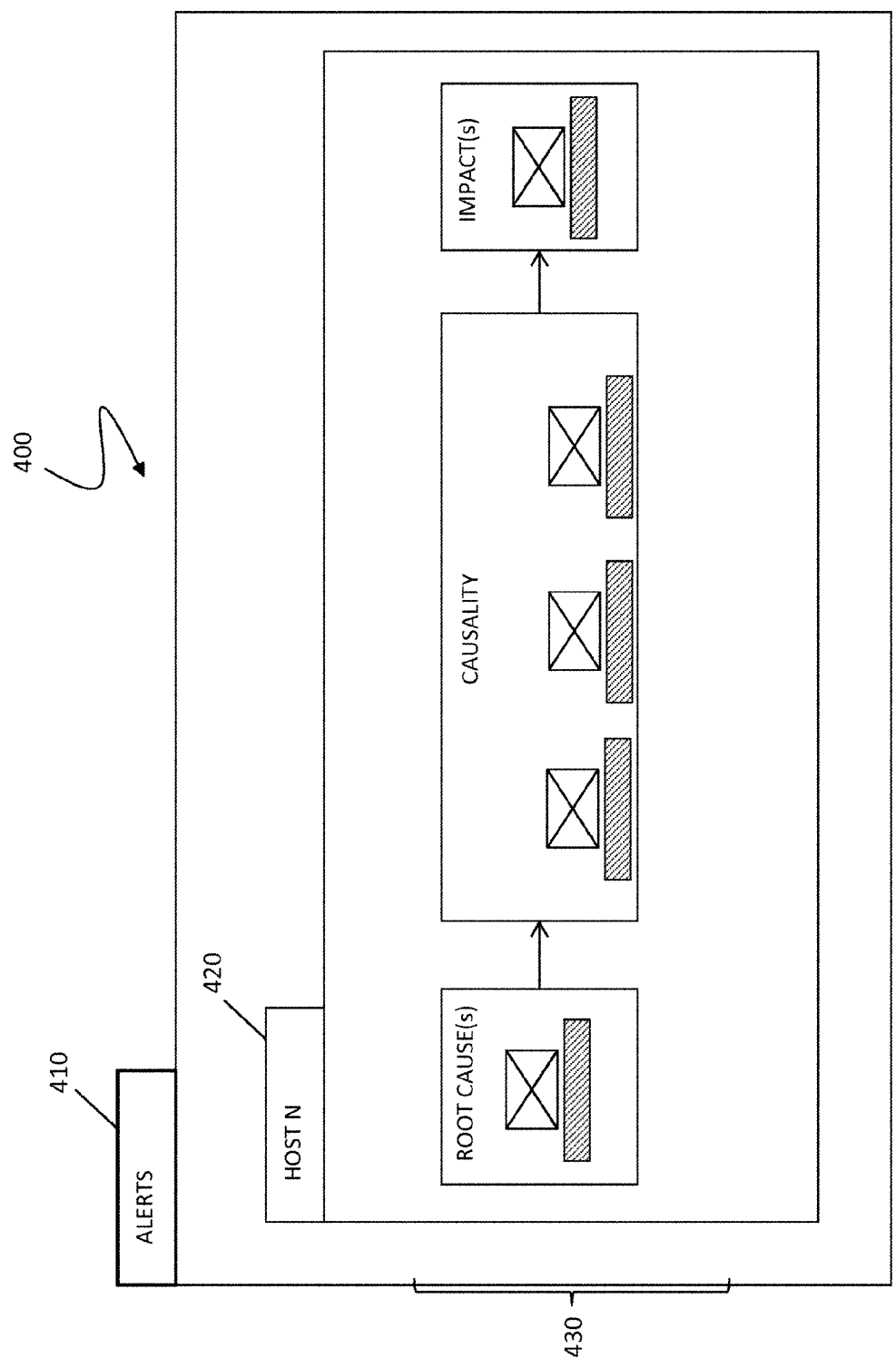
FIG. 8 is a schematic illustration showing a causality map that may be displayed for the user in response to a query submitted to the controller according to an embodiment of the system described herein.

FIG. 8 is a schematic illustration showing a causality map 400 that may be displayed for the user in response to a query submitted to the controller 100 according to an embodiment of the system described herein. The causality map 400 may be a display screen of the controller 400 showing determinations of alerts 410 as queried by a user. The alerts 410 may be shown in a topology view in connection with SAN alert information corresponding to one or more hosts (e.g., HOST N 420). A map overview section 430 of the causality map 400 may provide a visual topology of root cause(s), symptom causality and impact(s) for the one or more hosts, as determined according to processing like that discussed elsewhere herein.

FIG. 9 is a flow diagram 500 showing processing for on-the-fly alert relationship determinations according to an embodiment of the system described herein. At a step 502, an alert is received that may, for example, alert a user to the occurrence of a particular error symptom occurring on the SAN. After the step 502, processing proceeds to a step 504 where the alert is displayed on an interface of a controller. After the step 504, processing proceeds to a test step 506 where it is determined whether a user has requested alert relationship information corresponding to the received alert, for example, the user by activating a query using the interface. In various embodiments, the alert relationship information queries may include requests for one or more root causes of the alert and/or impacts of the alert. If, at the test step 506, it is determined that the user has made no query request for further alert relationship information, then processing is complete. If, at the test step 506, it is determined that the user has requested alert relationship information then processing proceeds to a step 508 where immediate relationships of the alert are determined. For example, the immediate relationships may be include the directly preceding cause of the alert and/or the directly subsequent cause/impact of the alert.

After the step 508, processing proceeds to a step 510 where an alert relationship path is determined for traversal. For example, to determine a root cause of a received alert, the beginning of the traversal path will be an immediately preceding cause of the received alert. In the case where there are more than one preceding causes, all but one of the causes will be temporarily suspended (e.g., pushed onto a stack and/or other software structure for later retrieval) and the remaining cause will indicate the beginning of the path for traversal. A similar but reverse process may be used for obtaining a desired impact of a received alert. After the step 510, processing proceeds to a step 512 where the selected alert relationship path is traversed. After the step 512, processing proceeds to a step 514 where desired alert relationship information (e.g., root cause or impact) is obtained and stored.

After the step 514, processing proceeds to a test step 516 where it is determined if another path exists for received alert. For example, if the received alert was caused by two different alerts, and a first one of the causality alerts was initially used to establish the path for traversal, then the second of the causality alerts may be used to establish another path. Accordingly, if, at the test step 516, it is determined that another path exists then processing proceeds back to the step 510 to determine the (next) alert relationship path for traversal. For example, the next causality alert may be popped from the software stack where it has been temporarily stored. If, at the test step 516, it is determined that another path does not exist for the received alert, then processing proceeds to a step 518 where the obtained and stored alert relationship information is displayed using a console of a controller, for example, responsive to a user's query. After the step 518, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:
1. A method for determining alert relationships in a distributed system, comprising:
  receiving an alert for the distributed system;
  determining whether alert relationship information is requested in a query concerning the received alert;
  determining a beginning of an alert relationship path for traversal based on the received alert and responsive to the query, wherein the beginning of the alert relationship path is determined by using alert attribute information of the received alert that identifies an immediate preceding or subsequent alert relationship of the received alert;
  traversing the alert relationship path to obtain alert relationship information responsive to the query, wherein the traversing of the alert relationship path is performed on-the-fly, wherein the on-the-fly traversing of the alert relationship path is performed without using a stored hierarchical relationship structure of alerts, and includes determining, for each alert reached in the alert relationship path, immediate preceding or subsequent alert rela- tionships maintained as alert attribute information for each alert in order to continue the on-the-fly traversing; and displaying the alert relationship information responsive to the query.

2. The method according to claim 1, wherein the distributed system includes a storage area network.

3. The method according to claim 1, wherein the method is performed using a controller having a console providing a user interface.

4. The method according to claim 3, wherein the console includes a RESTful interface.

5. The method according to claim 1, wherein the alert relationship information includes at least one root cause of the received alert.

6. The method according to claim 1, wherein the alert relationship information includes at least one impact caused by the received alert.

7. The method according to claim 1, wherein the alert relationship path includes at least one alert relationship beyond the immediate preceding or subsequent alert relationship of the received alert.

8. A non-transitory computer readable medium storing software for determining alert relationships in a distributed system, the software comprising:
executable code that receives an alert for the distributed system;
executable code that determines whether alert relationship information is requested in a query concerning the received alert;
executable code that determines a beginning of an alert relationship path for traversal based on the received alert and responsive to the query, wherein the beginning of the alert relationship path is determined by using alert attribute information of the received alert that identifies an immediate preceding or subsequent alert relationship of the received alert;
executable code that traverses the alert relationship path to obtain alert relationship information responsive to the query, wherein the traversing of the alert relationship path is performed on-the-fly, wherein the on-the-fly traversing of the alert relationship path is performed without using a stored hierarchical relationship structure of alerts, and includes determining, for each alert reached in the alert relationship path, immediate preceding or subsequent alert relationships maintained as alert attribute information for each alert in order to continue the on-the-fly traversing; and
executable code that displays the alert relationship information responsive to the query.

9. The non-transitory computer readable medium according to claim 8, wherein the distributed system includes a storage area network.

10. The non-transitory computer readable medium according to claim 8, wherein the software is executed using a controller having a console providing a user interface.

11. The non-transitory computer readable medium according to claim 10, wherein the console includes a RESTful interface.

12. The non-transitory computer readable medium according to claim 8, wherein the alert relationship information includes at least one root cause of the received alert.

13. The non-transitory computer readable medium according to claim 8, wherein the alert relationship information includes at least one impact caused by the received alert.

14. The non-transitory computer readable medium according to claim 8, wherein the alert relationship path includes at least one alert relationship beyond the immediate preceding or subsequent alert relationship of the received alert.

15. A system for determining alert relationships in a distributed system, comprising:
a controller providing a console with a user interface, wherein the controller includes at least one processor that executes software stored on a computer readable medium, the software comprising:
executable code that receives an alert for the distributed system;
executable code that determines whether alert relationship information is requested in a query concerning the received alert;
executable code that determines a beginning of an alert relationship path for traversal based on the received alert and responsive to the query, wherein the beginning of the alert relationship path is determined by using alert attribute information of the received alert that identifies an immediate preceding or subsequent alert relationship of the received alert;
executable code that traverses the alert relationship path to obtain alert relationship information responsive to the query, wherein the traversing of the alert relationship path is performed on-the-fly, wherein the on-the-fly traversing of the alert relationship path is performed without using a stored hierarchical relationship structure of alerts, and includes determining, for each alert reached in the alert relationship path, immediate preceding or subsequent alert relationships maintained as alert attribute information for each alert in order to continue the on-the-fly traversing; and
executable code that displays the alert relationship information responsive to the query.

16. The system according to claim 15, wherein the distributed system includes a storage area network.

17. The system according to claim 15, wherein the console includes a RESTful interface.

18. The system according to claim 15, wherein the alert relationship information includes at least one root cause of the received alert.

19. The system according to claim 15, wherein the alert relationship information includes at least one impact caused by the received alert.

20. The system according to claim 15, wherein the alert relationship path includes at least one alert relationship beyond the immediate preceding or subsequent alert relationship of the received alert.

* * * * *